Nov. 19, 1968  J. A. DENNER  3,411,360

TEMPERATURE CONTROLLER AND/OR RECORDER WITH COMPENSATOR

Filed Oct. 21, 1965

INVENTOR.
John A. Denner
BY
Roberts, Cushman & Grover
ATT'YS

United States Patent Office 3,411,360
Patented Nov. 19, 1968

3,411,360
TEMPERATURE CONTROLLER AND/OR RECORDER WITH COMPENSATOR
John A. Denner, West Roxbury, Mass., assignor to United Electric Controls Company, Watertown, Mass., a corporation of Massachusetts
Filed Oct. 21, 1965, Ser. No. 499,925
10 Claims. (Cl. 73—362.5)

ABSTRACT OF THE DISCLOSURE

A temperature compensator comprising telescoping parts having distal and proximate ends, means yieldably resisting expansion of the telescoping parts, and a thermally expandable rod disposed between the parts with its ends in engagement, respectively, with the proximal ends of the parts so that expansion of the parts is neutralized by the expansion of the rod.

Many industrial operations are controlled from a distance by installing a temperature-responsive device adjacent the operation and transmitting the changes in temperature through suitable channels to actuate a mechanism and in turn an indicator and/or control switch at a control station to modify the operation. When an expandable fluid is used to transmit the change, a bellows-type motor is often employed for effecting operation of the indicator and/or switch. The motor, however, is responsive not only to the expanding fluid internally thereof, but also to the ambient temperature externally thereof, and the principal objects of this invention are to provide a compensator operably connecting the motor and the indicator and/or switch, which will compensate for local temperature changes, which would adversely affect the true temperature change at the point where the sensing device is located; and to provide a compensator assembly that is inexpensive to manufacture and embodies a thermally-responsive element which is readily available, will withstand extreme temperature changes, will resist oxidation, which has a relatively high coefficient of expansion, has high thermal conductivity and is uniform in its response.

As herein illustrated, the assembly comprises a movable part and a part to be moved by the movable part which bear a predetermined relation to each other, and a thermally-responsive rod arranged between the parts operable to transmit the motion of the movable part to the part to be moved; characterized in that the rod is constructed and arranged to maintain said relative position of the parts in spite of changes in the dimensions of the parts due to changes in local ambient conditions. The movable part is connected to an expandable motor which is in turn connected to a remotely located sensing device and has an elongate hollow portion at the distal end of which there is an abutment. At the proximal end there is an axially elongate, diametrically disposed slot. The part to be moved is a second hollow elongate part, is telescopically mounted on the first part and there is means fixed to the second part which extends diametrically through the slot in the first part operable to limit distention of the parts. There are axially spaced shoulders on the parts situated, respectively, exteriorly of the first part and interiorly of the second part, between which there is mounted on the first part a coiled spring with its ends abutting the shoulders operating to distend the parts. The rod, which is responsive to temperature changes, is disposed within the first part with one end bearing against the abutment and the other end constrained by the diametrical means. The expansion motor and first and second parts are supported within a hollow elongate cylindrical jacket with one end of the motor fixed within the jacket and the other end free to move therein and with the second means projecting from the opposite end of the jacket. Expansion of the motor effects movement of the second means relative to the opposite end of the jacket and there is an adjustable screw fixed in the projecting end for operable engagement with an indicator instrument located at a control station. The rod is characterized in that it has a relatively high coefficient of expansion, remains flexible between wide extremes in temperature, changes dimensions uniformly, is resistant to high temperature, has high thermal conductivity, is non-oxidizable and is long wearing. The material employed herein embodying the foregoing characteristics is commonly known as "silicone rubber" and in the assembly herein illustrated, is approximately one inch long and .1745 to .1765 inch in diameter. Any equivalent plastic material embodying the characteristics related above may be used in lieu of the silicone rubber.

The invention will now be described in greater detail with reference to the accompanying drawings wherein.

Figure 1:
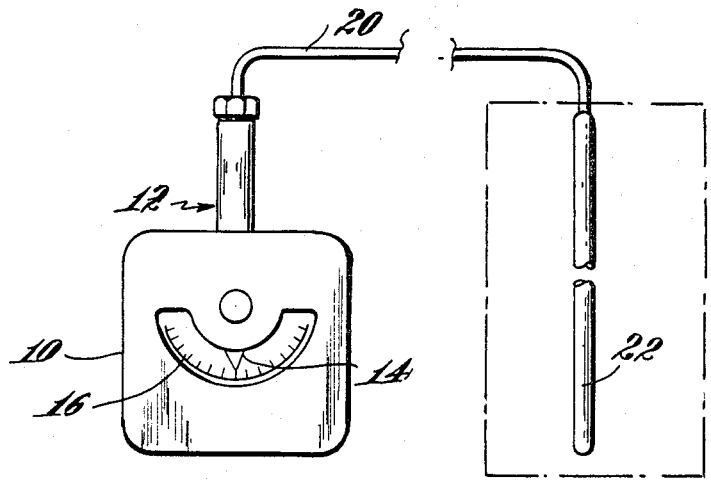
FIG. 1 shows an instrument designed to indicate a change in temperature, and optionally to control the temperature at a distant operation, provided with the compensator which forms the subject matter of this invention, the latter being connected to a sensing device in the form of a sensing bulb containing a volatile fluid located at the point of operation.
Figure 2:
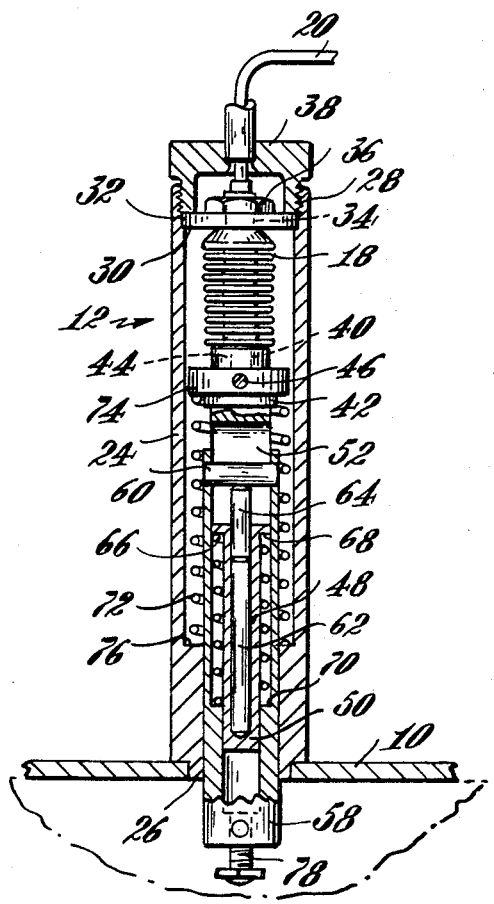
FIG. 2 is an enlarged diametrical section of the compensator in one plane.
Figure 3:
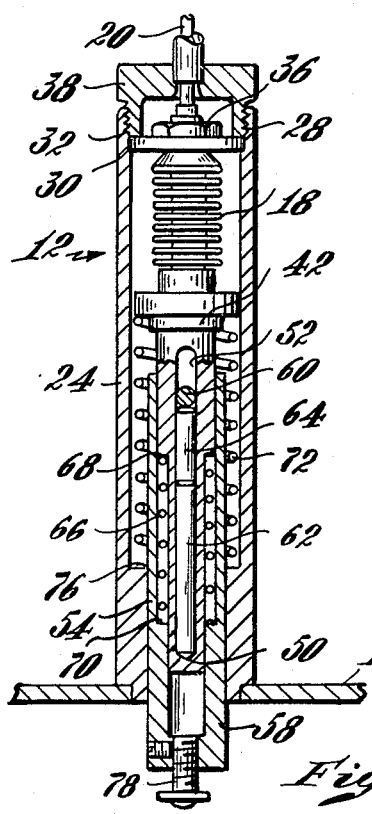
FIG. 3 is an enlarged diametrical section in a plane at right angles to that shown in FIG. 2.

Referring to FIG. 1, there is shown an indicator and/or recorder 10 for recording temperature changes and optionally in response to said change to effect actuation of a control switch, for example an electrical switch (not shown herein), which would modify the operation in accordance with prearranged planning. A combined motion-transmitter and compensator 12 is connected to the indicator through a wall of the indicator instrument and is operable to effect movement of an indicator element 14 along a scale 16 and also at a predetermined adjustable point to effect actuation of a control switch as suggested. The motion-transmitter compensator 12 embodies an expandable motor 18 (FIGS. 2 and 3) which is connected by a capillary tube 20 to a sensing bulb 22 at the place of operation indicated by the dotted lines (FIG. 1) where the change in temperature is to be measured. The bulb 22 contains a volatile liquid, expansion of which produces expansion of the motor 18 and hence the motion which is necessary to move the indicator element 14 and to effect operation of a switch.

The motion-transmitter and compensator comprises a hollow cylindrical jacket 24, one end of which is reduced and forced into a wall of the indicator instrument 10. The other end is provided with internal threads 28 and a shoulder 30. The motor 18 is supported in the jacket at one end by a rigid disc 32 set into the end of the jacket against the shoulder 30 and contains a threaded opening through which a threaded neck 34 at one end of the motor is innserted and secured by a nut 36. The capillary tube 20 is led into the upper end of the jacket through a cap 38 screwed into the threaded end of the jacket against the disc 32.

The motor 18 is supported in concentric relation to the longitudinal axis of the jacket with one end fixed in the disc 32 and the opposite end free to move longitudinally within the jacket. At the free end of the motor there is a threaded neck 40 to which there is secured one end of an elongate movable part 42. As illustrated, the one end contains an internally threaded opening 44 adapted to be screwed onto the threaded neck 40 at the free end of the motor. A set screw 46 is provided for fixing the movable part to the neck. The movable part 42 has a tubular portion 48 extending axially along the jacket, the distal end of which is closed and provides an abutment 50 for a purpose which will appear hereinafter. At the proximal end of the tubular portion there is a diametrically disposed, axially elongate slot 52. A second elongate hollow part 54 which is to be moved by the movable part is supported within the jacket with a portion telescopically engaged with the portion 48 of the movable part 42 and with an outer portion 58 extending from the jacket into the instrument case 10. The inner end of the part 54 has mounted on it a diametrical pin 60 which extends through the slot 52 in the part 42, with its ends fixed in the hollow part 54. This pin 60 limits the relative movement of the parts 42 and 54. A slender rod 62 is mounted in the inner part with one end abutting the abutment 50 and the other end abutting one end of a spacer 64, the opposite end of which abuts the pin 60. The rod 62 and spacer 64 are constrained between the abutment 50 and the pin 60 by a coiled spring 66 mounted between the parts 54 and 48 about the part 48 with its ends abutting a shoulder 68 formed externally of the tubular part 48 and a shoulder 70 formed internally of the tubular part 54. The spring holds the parts distended and the rod 62 controls the amount of distention, increasing it by thermal contraction and decreasing it by thermal expansion, and is designed to compensate for the linear changes experienced in the component parts of the motion transmitting device in response to local ambient conditions. A coiled spring 72 is mounted between the part 54 and the jacket 24 with its ends constrained between a shoulder 74 on the part 42 and a shoulder 76 internally of the jacket. This spring normally operates to oppose expansion of the motor 18 and to restore the motor to its contracted position when the pressure fluid contracts.

At the inner end 58 of the plunger part 54 there is an adjustable screw 78 for contact with the indicator mechanism and/or the switch mechanism in the indicator instrument.

The compensator derives its simplicity from the fact that the compensation is provided by the element 62 which is a relatively simple, slender, thermally-responsive rod of silicone rubber which has a coefficient of expansion in the order of $20 \times 10^{-5}$, is flexible between $-30°$ and $+150°$ F., is resistant to extreme temperature changes, is non-oxidizable, has a high thermal conductivity, has a long life and is uniform in operation from piece to piece. In contrast to compensating bellows used in other instruments of this kind, it occupies very litter space, is inexpensive and is readily replaceable when required. As illustrated, the silicone rod is in the order of one inch in length, is solid in cross-section and in the order of .1745 to .1765 inch in diameter. Since the rod 62 is of relatively small diameter and has a relatively high thermal conductivity, it is sensitive to the temperature changes of the ambient atmosphere and also of the component parts of the assembly and hence there will be no appreciable delayed response to such changes.

In operation, expansion of the expandable fluid in the bulb 22 at the place where the operation is in process is transmitted through the capillary 20 to the motor 18, causing expansion of the motor which forces the movable part 42 axially within the jacket 24 and the part 54 to be moved through the wall of the instrument 10 so as to engage the adjustable screw 78 with the operating mechanism within the instrument. The telescoping arrangement of the parts 42 and 54 with the compensating rod 62 mounted therebetween provides for contracting the parts relative to each other in response to a temperature increase and of distending the parts relative to each other in response to a temperature decrease so as to elminimate error introduced by a temperature change at the control station.

As related above the motion transmitter or compensator may be employed in combination with an instrument which records temperature changes as well as indicating such changes and at a preselected temperature effects actuation of a control switch. Such an instrument is shown in Patent No. 3,105,638, dated Oct. 1, 1963.

It should be understood that the present disclosure is for the purpose of illustration only and that this invention includes all modfications and equivalents which fall within the scope of the appended claims.

I claim:
1. A device for transmitting movement uninfluenced by ambient conditions, comprising a movable part and a part to be moved telescopically interengaged, means fixed to one part and connected to the other part operable to permit limited relative movement of the parts, means yieldably urging the parts to distended positions, a thermally-responsive rod expandable in response to an increase in ambient temperature mounted between the parts with one end supported by one part and the other end bearing against said means, said rod being operable to determine the relative position of the parts at any given time, and being operable by its expansion, due to a rise in ambient temperature, to effect contraction of the parts relative to each other in direct proportion to the inverse expansion of the parts in response to said rise in ambient temerature.

2. A temperature compensator comprising a housing in which are arranged concentric telescoping, linearly movable parts which include a first movable part and a second other part to be moved, said parts each having proximal and distal ends, a motor connected to the distal end of said first movable part, an axially adjustable plunger having screw means at the distal end of said other part, axially spaced, confronting shoulders on the parts, a first coiled spring disposed under compression between the shoulders, a second coiled spring mounted between said motor and a distal portion of said housing and an axially disposed, thermally responsive rod mounted between the proximal ends of the parts, expansion of which upon temperature increases provides for contracting said telescoping parts relative to each other by an amount substantially equal to the thermal expansion of said telescoping parts.

3. A temperature compensator according to claim 2, comprising a cylindrical housing within which the parts are mounted with the distal end of said other part axially slidable through one end of the housing, said motor being of the expandable kind with one end fixed to said movable part and its opposite end fixed to the opposite end of the housing, and axially spaced confronting shoulders on said movable part and on the housing between which is mounted a spring opposing expansion of the motor.

4. A temperature compensator according to claim 2, wherein said movable part is disposed within said other part to be moved, comprising an axially slotted head at the distal end of the movable part, a pin fixed diametrically of the proximal end of said other part, said pin extending through said slot, said movable part having at its proximal end an abutment axially spaced from the pin and confronting the same, and said thermally responsive rod being mounted within the movable part for axially movement therein with its ends operably engaged respectively with the pin and said abutment.

5. A temperature compensator according to claim 2, wherein a spacer is mounted between one end of the thermally-responsive rod and the proximal end adjacent thereto.

6. A device according to claim 2, wherein the rod is of relatively small diameter and solid section.

7. A device according to claim 2, wherein the rod is a non-metallic, thermally-responsive, uniformly expandable material.

8. A device according to claim 2, wherein the rod is comprised of silicone rubber.

9. A device according to claim 2, characterized in that the rod is of relatively small diameter and has relatively high heat conductivity.

10. A device according to claim 2, characterized in that the rod has a coefficient of expansion in the order of $20 \times 10^{-5}$, is flexible over a range of approximately $-30°$ and $+150°$ F., and is substantially non-oxidizable.

References Cited
UNITED STATES PATENTS

| | | | |
|---|---|---|---|
| 614,241 | 11/1898 | Uehling | 73—362.4 X |
| 2,395,261 | 2/1946 | Findley | 73—362.3 X |
| 2,565,713 | 8/1951 | Allen | 73—362.3 |
| 2,941,404 | 6/1960 | Woods | 73—362.5 X |

S. CLEMENT SWISHER, *Acting Primary Examiner.*

D. M. YASICH, *Assistant Examiner.*